United States Patent [19]
Vatland et al.

[11] Patent Number: 6,091,507
[45] Date of Patent: *Jul. 18, 2000

[54] METHOD AND APPARATUS FOR PRINTING A DOCUMENT OVER A NETWORK

[75] Inventors: Danny James Vatland, Chanhassen; Jeff David Pagel, Inver Grove Heights, both of Minn.

[73] Assignee: ColorSpan Corporation, Eden Praire, Minn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/270,046

[22] Filed: Jul. 1, 1994

[51] Int. Cl.[7] .................................................. G06F 15/00
[52] U.S. Cl. ........................................ 358/1.15; 358/1.13
[58] Field of Search ................................... 395/101, 109, 395/112, 114, 118, 275, 200; 358/443, 448, 501, 530; 709/107, 201, 205, 218, 238, 249; 710/20, 21, 100, 131; 711/1, 100, 127; 712/28, 33, 206

[56] References Cited

U.S. PATENT DOCUMENTS

| | | | |
|---|---|---|---|
| 4,439,760 | 3/1984 | Fleming | 340/799 |
| 4,712,214 | 12/1987 | Meltzer et al. | 371/32 |
| 4,887,228 | 12/1989 | Robert | 364/521 |
| 4,993,025 | 2/1991 | Vesel et al. | 370/94.1 |
| 5,014,221 | 5/1991 | Mogul | 395/113 |
| 5,018,138 | 5/1991 | Twitty et al. | 370/94.1 |
| 5,021,949 | 6/1991 | Morten et al. | 395/200.09 |
| 5,075,875 | 12/1991 | Love et al. | 395/117 |

(List continued on next page.)

FOREIGN PATENT DOCUMENTS

| | | |
|---|---|---|
| 90310867 | 11/1990 | European Pat. Off. . |
| 92120100 | 11/1992 | European Pat. Off. . |
| 0529808 | 9/1993 | European Pat. Off. .......... G06F 3/12 |

OTHER PUBLICATIONS

Computer Technology Review, "Print Rasterization Moves Hostward With Support From SCSI", by Tom Bertram and Dan Miller, dated May 12, 1992, No. 6, Los Angeles, CA, US.

Inside AppleTalk, Second Edition, pp. I–22 thru I–23, and 10–1 thru 12–39.

Felici, "RIPs Getting Soft in Their Old Age" *PUBLISH*, Mar. 1994, pp. 44, 46 and 49.

Hurwicz, "Laser Printers: Breaking the 600–DPI Barrier", *PUBLISH*, Mar. 1994, pp. 52 and 54.

Hayes, "The Printers Talk Back", *BYTE*, Dec. 1993, pp. 103, 104, 106, 108 and 110.

Wayner, "Print Pages Faster", *BYTE*, Dec. 1993, pp. 115, 116, 118, 120, 121, 122 and 123.

*Primary Examiner*—Dov Popovici
*Assistant Examiner*—Gabriel I. Garcia
*Attorney, Agent, or Firm*—Patterson & Kluth, P.A.

[57] ABSTRACT

A network protocol, transmission format, and hardware interface facilitating high speed transmission of raster data from a host computer having a raster image processor to a printer. The protocol and hardware interface of the present invention minimize memory-to-memory transfers of raster data by defining data transfers directly from local memory of network hardware to memory associated with a raster connection management module. The transmission format of the present invention minimizes handshaking by sending a large number of data packets between acknowledgements. In addition, the present invention allows a host computer system to request printer profile information, and process raster data based on the profile information.

16 Claims, 8 Drawing Sheets

U.S. PATENT DOCUMENTS

| | | | |
|---|---|---|---|
| 5,084,877 | 1/1992 | Netravali et al. | 371/32 |
| 5,113,494 | 5/1992 | Menedez et al. | 395/163 |
| 5,122,973 | 6/1992 | Venner et al. | 395/117 |
| 5,163,055 | 11/1992 | Lee et al. | 371/32 |
| 5,163,122 | 11/1992 | Urabe et al. | 395/109 |
| 5,220,674 | 6/1993 | Morgan et al. | 395/110 |
| 5,224,098 | 6/1993 | Bird et al. | 370/94.1 |
| 5,231,634 | 7/1993 | Giles et al. | 370/95.1 |
| 5,257,384 | 10/1993 | Farrand et al. | 395/725 |
| 5,260,933 | 11/1993 | Rouse | 370/14 |
| 5,287,354 | 2/1994 | Teel, Jr. et al. | 370/85.7 |
| 5,319,641 | 6/1994 | Fridrich et al. | 370/85.3 |
| 5,321,813 | 6/1994 | McMillen et al. | 395/200 |
| 5,379,296 | 1/1995 | Johnson et al. | 370/60 |

METHOD AND APPARATUS FOR PRINTING A DOCUMENT OVER A NETWORK

BACKGROUND OF THE INVENTION

The present invention is a method and apparatus for printing a document over a network. More specifically, the present invention provides a method and apparatus wherein a host computer generates a raster image from a series of page description language instructions representative of the document, and the raster image is transferred over a network to one or more printers where it is printed.

In the prior art, a document is printed over a network by preparing a series of page description language (PDL) instructions at a host computer and transferring those instructions to a printer over a network. The printer includes a raster image processor (RIP) that processes the series of PDL instructions into a raster image that is stored in a frame buffer, and the printer's print engine prints the raster image from the frame buffer.

Processing the series of PDL instructions into a raster image is known in the art as RIPing, which is a computation intensive and memory intensive process that requires a significant amount of time relative to the amount of time it takes for the print engine to print the image. Therefore, prior art printers that process PDL instructions into raster images generally spend significant amounts of time RIPing the PDL image. During much of this time, the print engine must remain idle waiting for the raster image.

This problem is addressed in U.S. Pat. No. 5,113,494 to Menendez et al., which discloses a high speed raster image processor that RIPs PDL instructions fast enough to minimize the idle time of a laser printer's print engine. The RIP disclosed by Menendez et al. resides in a common printer node with the print engine, and specifies a dedicated connection between the RIP and the print engine. This approach dedicates a significant amount of hardware to perform the RIP function, and increases the cost of the printer.

Another prior approach to this problem is to provide the host computer with a RIP, which is typically implemented by software on the host computer. While this approach does not generally decrease the time required to RIP a document, multiple hosts can RIP documents in parallel, with each host submitting a raster image of a document to a printer's print engine when RIPing is complete. The drawback to this approach, however, is that a tremendous amount of data must be sent over the network. An 8½×11 inch page of color text represented by a sequence of PDL instructions and printed at a resolution of 300 dots per inch (dpi) will generally not require more than twenty kilobytes of data to be transferred over a network. However, a raster image of this same page of color text will require about four megabytes of data to be transferred over a network. In addition, for a printer having a large form factor, such as a 36 inch wide color printer, the amount of data to be transferred makes this approach prohibitive. A 300 DPI color image at a size of 54×54 inches requires about 125 megabytes of data to be transferred over the network. Since ripless printers do not contain data storage resources of this magnitude, the raster image must be retransmitted over the network for each printed copy.

On a typical Ethernet network adhering to the IEEE 802.3 specification, raster data cannot be transferred to printer fast enough to feed a moderately fast print engine. In a laser printer, the printer engine must pause between pages to wait for the raster image to be received. In an ink jet printer, the printer may have to pause while printing a page to wait for additional raster data. These pauses may result in a banding effect because the pause may cause the ink deposited during the preceding pass of the print head to dry before the next pass can occur, while most passes will occur continuously and the ink will not dry. When the ink is not dry, the ink deposited between successive passes will blend together and minimize the banding associated with successive passes of the print head, while banding will be more pronounced if the ink has dried before the next pass of the print head occurs.

Another problem associated with RIPing the series of PDL instructions at the host computer is that host computer's RIP will generally lack information about the media and inks of the printer that will eventually print the document. When the RIP is integrated in the printer, the RIP is generally provided with this information.

SUMMARY OF THE INVENTION

The present invention is method and apparatus for printing a document over a network. In the present invention, a host computer based raster image processor processes page description language instructions representative of a document to form a raster image representative of the document. A high-speed virtual connection between the raster image processor and the printer is opened and raster data is transferred over the network to a selected printer where the document is printed.

DETAILED DESCRIPTION OF THE PREFERRED EMBODIMENTS

Figure 1:
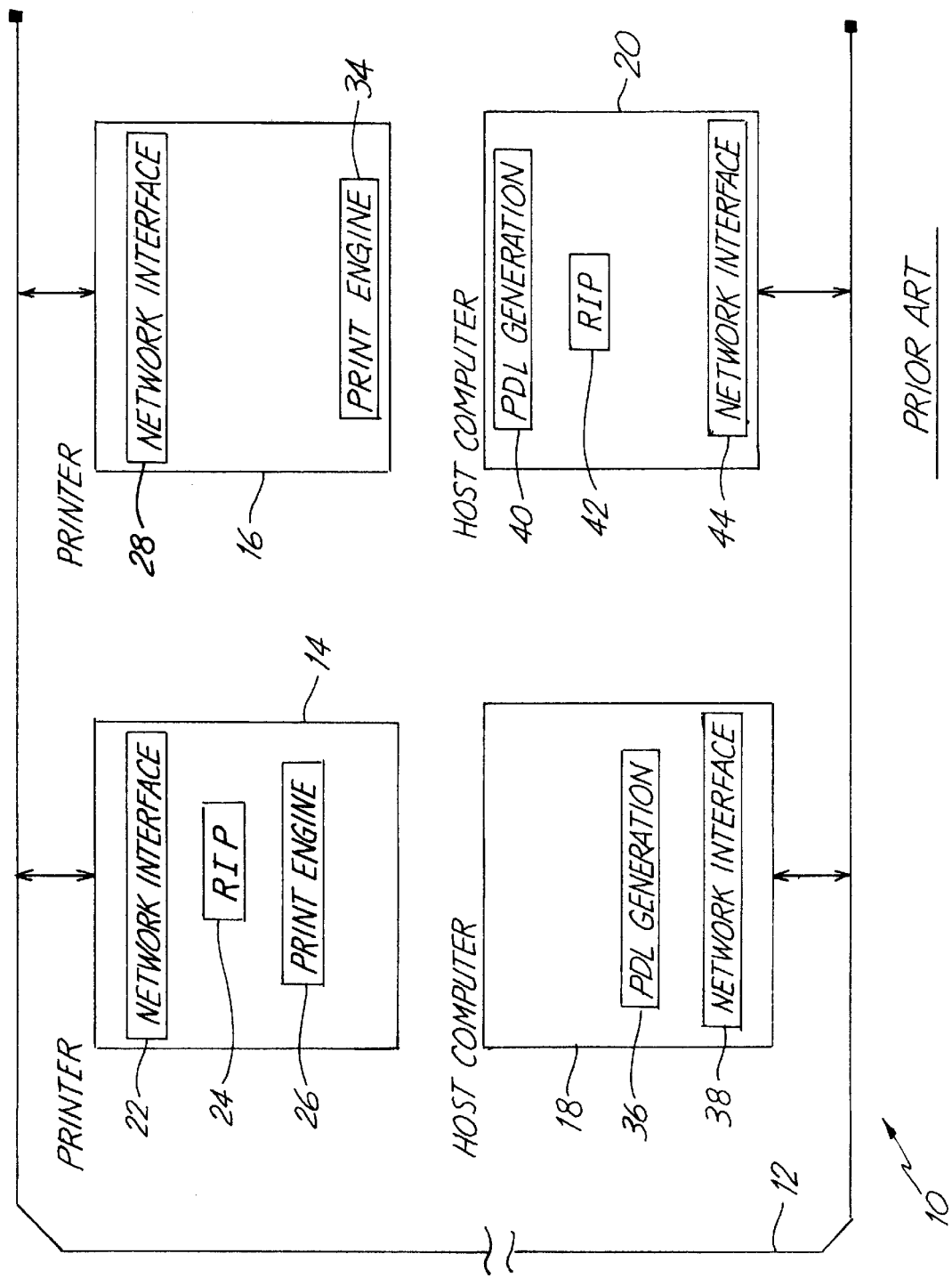
FIG. 1 is a block diagram of a typical prior art networked computing system.

FIG. 1 is a block diagram of a typical prior art networked computing system 10. System 10 is comprised of network bus 12, printing devices 14 and 16, and host computers 18 and 20.

When either computer system 18 or 20 desires to print a document, it assembles page description language (PDL) instructions represented in FIG. 1 by PDL generation modules 36 and 40 in computer systems 18 and 20, respectively. PDL generation modules 36 and 40 may be a word processor, a desktop publishing program, a CAD program, or any other program resident at the host computer that is capable of generating a series of PDL instructions. Additionally, modules 36 and 40 may provide PDL instructions that were previously generated and are now stored on storage media, such a hard disc drive. Examples of PDL's include Adobe's PostScript® language, Hewlett Packard's HP-GL/2 language, and the PCL printer control language.

Before a printer can print the document, the series of PDL instructions must be processed by a raster image processor (RIP) to form a raster image. This process is known in the art as raster image processing, or RIPing. The raster image is a bit-mapped representation of the document to be printed, with each bit in the bitmap representing the absence or presence of a dot (or pixel) on the printed page.

In the prior art, it was common for the printer to include a RIP. For example, in FIG. 1 host computer 18 generated a series of PDL instructions at PDL generation module 18, and the instructions were sent through network interface 38 to network 12. A printer such as printing device 14 received the PDL instruction from network 12 through network interface 22, processed PDL instructions into a raster image at RIP module 24, and printed the raster image at print engine module 26. Print engine module 26 may represent any type of printer known in the art, such a laser printer or an ink jet printer.

The process of converting an image from a series of PDL instructions into a raster image requires a large amount of computation and generates a vast quantity of data. For example, to generate a raster image of an 8½×11 inch black and white page at a resolution of 300 dots per inch (dpi) requires approximately a megabyte of data, while a similar four-color document requires approximately four megabytes of data. Because of the computational resources required to produce a raster image, the printer's RIP is often the bottleneck that determines the throughput of the printer.

One solution to this problem is to provide a RIP in the host computer, and send the processed raster image from the host computer to the printer. With the advent of powerful microprocessors such as the 80486, Pentium™, and PowerPC™ microprocessors, RIPing can be performed in the background by a host system without the user perceiving significant system degradation. In addition, this solution lowers the cost of the printer because the printer need not be provided with a RIP.

For example, in FIG. 1 RIP module 42 of host system 20 processes a sequence of instructions from PDL generation module 20 to form a raster image. The processed raster image is then sent to a printer via network interface 44 and network 12. Because the raster image has already been generated, the document can be printed by a printer not having a RIP, such printing device 16 in FIG. 1. In printing device 16, the raster image is received from network 12 via network interface 28, and provided to print engine 34. Alternately, the raster image can be provided to a printer having a RIP, such as printer 14, in which case the raster image will be provided directly to the print engine.

One complication that arises when the RIP is provided in a host computer is that the RIP may not have information about the printer's media and ink colors. When the RIP is in the printer, in theory the RIP will know how to properly interpret a color represented in a PDL instruction. For example, to generate a certain shade of red specified in the PDL instructions, the printer will have to deposit onto the print medium a combination of ink dots at certain ratios and positions. For a given color specified in a PDL instruction, the required combination and ratio will vary from printer to printer. When the RIP is in the host computer, a user must preset parameters of the RIP based on media information of the printer that will print the raster image.

Since individual host computers can RIP PDL instructions in parallel, and the print engine can print a raster image as soon as it receives it, the only other factor which can prevent a printer from printing at the maximum speed of its print engine is the bandwidth of the network.

Many networks conform to the IEEE 802.3 Ethernet specification, which defines the hardware requirements of the network, the size of data packets that are transported by the network, and a data communication standard called ISO-OSI. The ISO-OSI communication standard defines a seven layer stack of primitives that ensures accurate data transfers between the physical Ethernet hardware and applications accessing the network. Protocols that implement the ISO-OSI standard include TCP/IP, IPX/SPX, and AppleTalk™/EtherTalk™.

Figure 2:
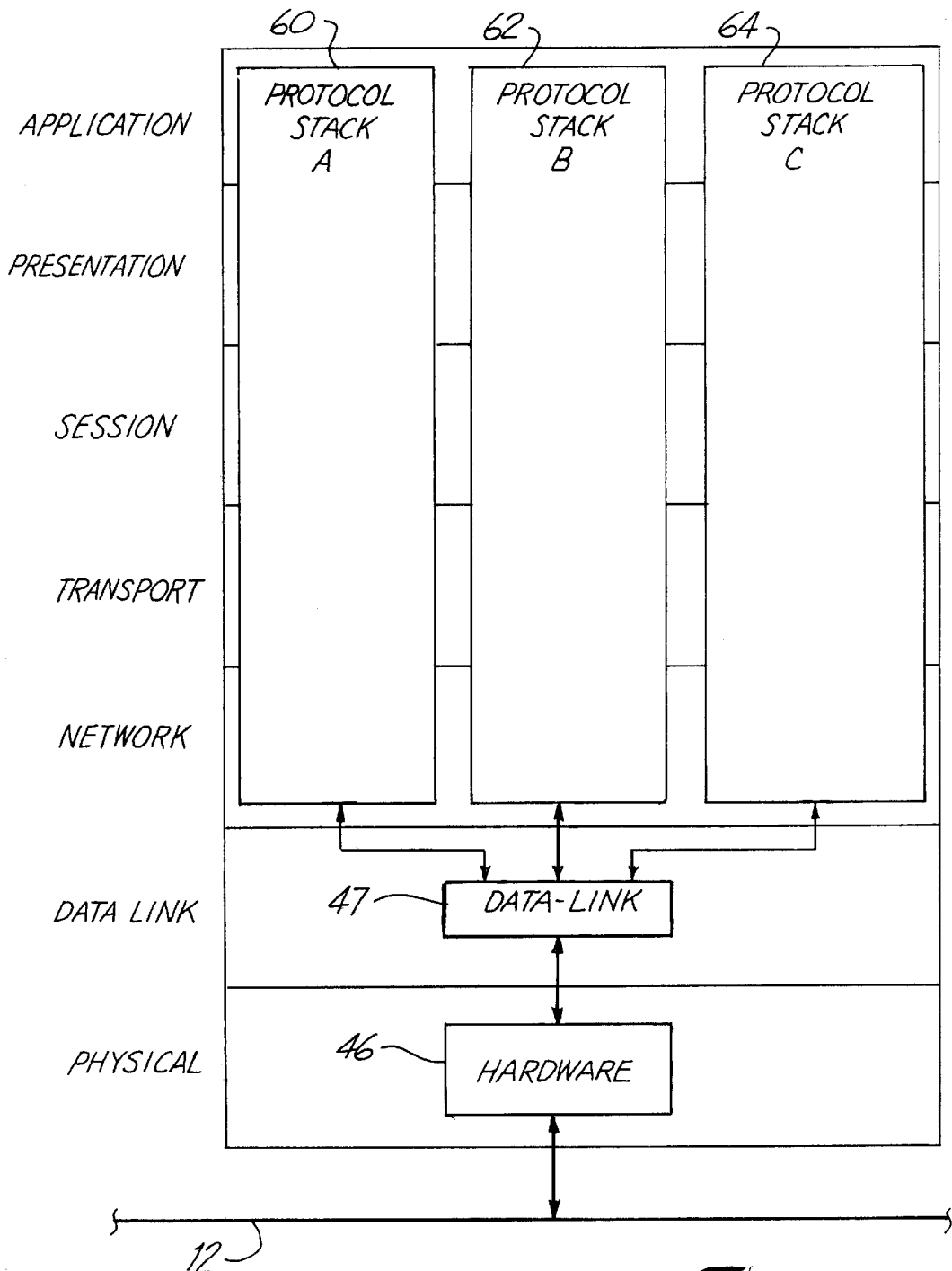
FIG. 2 is a diagram showing the ISO-OSI communication standard.

FIG. 2 is a diagram showing the ISO-OSI communication standard. With the exception of the application layer, this diagram represents network interfaces 22, 28, 38, and 44 in FIG. 1. The lowest (or first) layer is the physical layer, which represents network interface hardware 46. Network interface hardware 46 is responsible for transmitting data packets to and receiving data packets from network bus 12 and will be described in greater detail below with reference to FIG. 3.

The second layer is the data-link layer which represents data-link module 47. When receiving data from the network, data-link module 47 retrieves a data packet from local memory in the hardware 46 and examines the data packet to determine whether the packet conforms to one of the supported protocols. In FIG. 2, protocol stack 60 represents protocol A, protocol stack 62 represents protocol B, and protocol stack 64 represents protocol C. If the packet conforms to a supported protocol, the packet is provided to the network layer of the protocol stack of the protocol associated with the packet. When sending data to the network, data-link module 47 receives a data packet from the network layer of a protocol stack and provides the packet to the physical layer for transmission to the network.

The remaining five layers of the ISO-OSI standard are the network, transport, session, presentation, and application layers. The application layer represents the application that is communicating with the network. The other four layers perform various functions such as encoding and decoding addresses of packets, high level error correction, partitioning data into packets, maintaining packet order and flow control, implementing process-to-process data flow, and formatting data for applications. Generally, as data flows from layer to layer, it is repeatedly transferred and copied from a memory area associated with one layer to a memory area associated with another layer.

Figure 3:
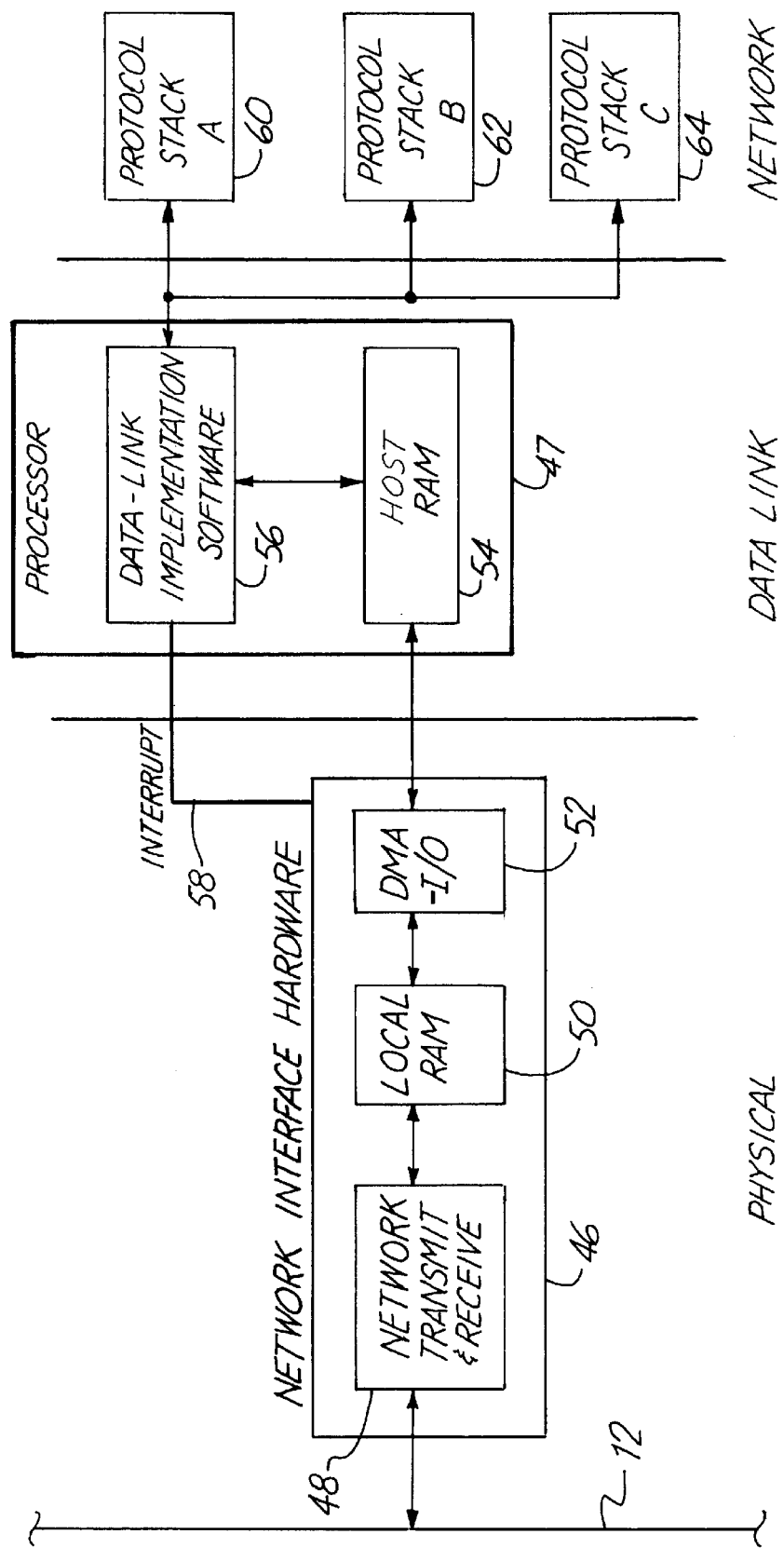
FIG. 3 is a block diagram showing a typical prior art implementation of the physical, data-link, and network layers.

FIG. 3 is a block diagram showing a typical prior art implementation of the physical, data-link, and network layers. The physical layer comprises network interface hardware 46, which includes network transmit and receive module 48, local RAM 50, and DMA-I/O module 52. The data-link layer comprises data-link module 47, which includes host processor RAM 54 and data-link implementation software 56. Finally, the network layer is comprised of a portion of each of the protocol stacks 60, 62, and 64.

Typically, network transmit and receive module 48 includes digital-to-analog converters, analog-to-digital converters, modulators, demodulators, and other components known in the art and required to convert the signals carried by network 12 into digital data suitable for manipulation by a computer system. When a data packet is received, module 46 stores the data packet in local RAM 50 and signals data-link module 47 by asserting interrupt 58. Data-link implementation software 56 responds by requesting DMA-I/O module 52 to transfer the contents of local RAM 50 into host processor RAM 54.

In prior systems, a complete data packet is transferred from the local RAM of the physical layer to the host processor RAM of the data link layer, even if the data packet contained data formatted in accordance with an unsupported protocol, and even if only a few bytes of data in the data packet were required by the application layer. In other words, a large number of bytes were transferred from one memory location to another unnecessarily.

The layers defined by the ISO-OSI standard ensure accurate and reliable data transfers between computer resources connected by an Ethernet network. The layers also ensure modularity and compatibility because the vendor of a product need only design the product to communicate with an adjacent layer. For example, a word processor (which is represented by the application layer) must only communicate with the presentation layer. Likewise, Ethernet hardware need only communicate with the data-link layer.

While the ISO-OSI standard ensures accuracy, reliability, modularity, and compatibility, these attributes are achieved at the expense of speed. The continual copying of data (even unneeded data) from one memory location to another and the frequent handshaking that provides accuracy and reliability detract from potential throughput that could be obtained by a network based on the IEEE 802.3 Ethernet specification.

Figure 4:
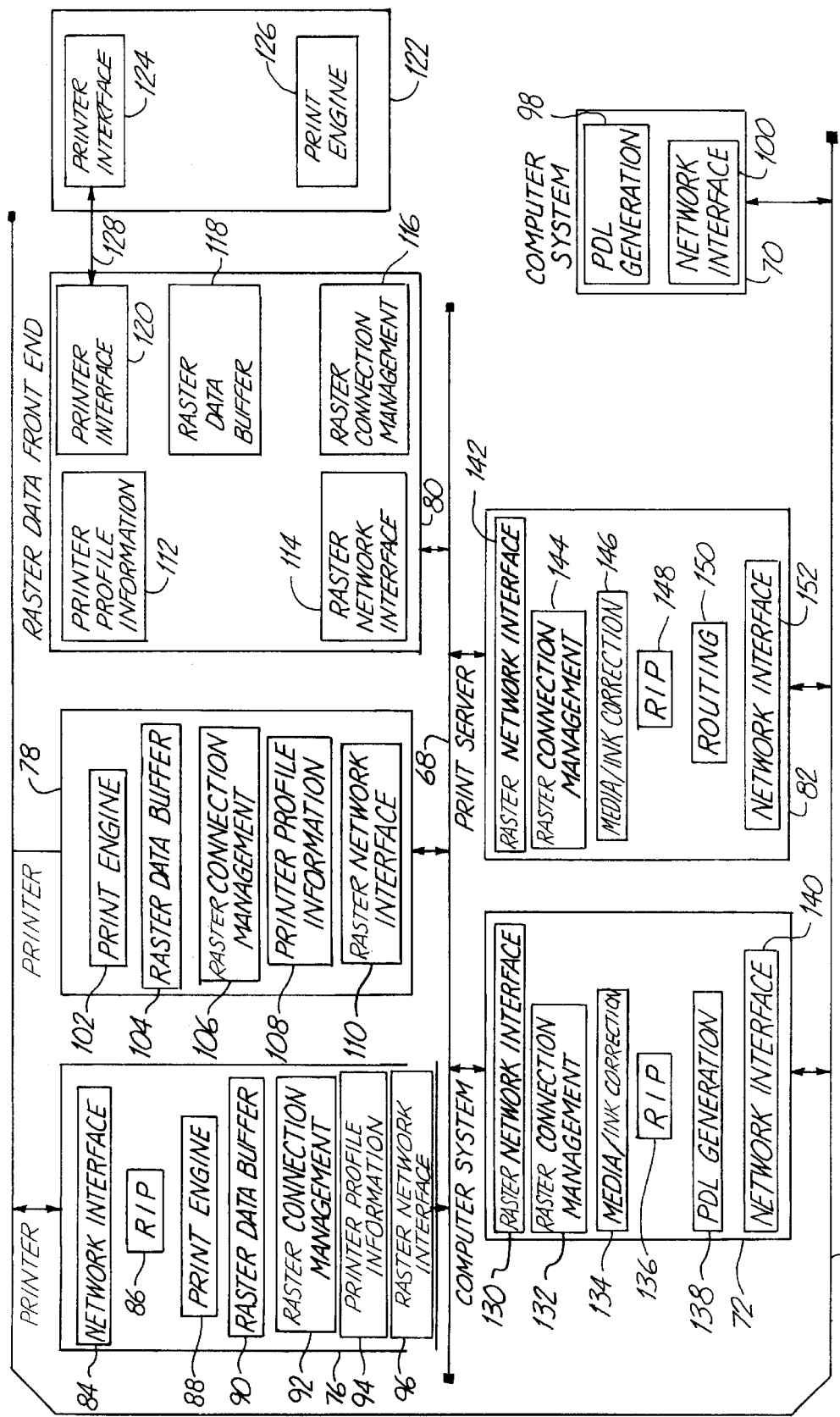
FIG. 4 is a block diagram of a computing system in accordance with one presently preferred embodiment of the present invention.

FIG. 4 is a block diagram of a computing system 65 in accordance with one presently preferred embodiment of the present invention. System 65 includes a conventional network bus 66, as is known in the art, and a raster network bus 68. Raster network bus 68 is a dedicated network designed to transmit raster data from a RIP to a printer.

In FIG. 4, computer systems 70 and 72, printer 76, and print server 82 are connected via network bus 66. Computer system 72, printers 76 and 78, raster data front end 80, and print server 82 are connected via raster network bus 68.

Printer 76 includes network interface 84, RIP 86, print engine 88, raster data buffer 90, raster connection module 92, and raster network interface 96. Since printer 76 is provided with a RIP, printer 76 can accept and process PDL instructions. For example, computer system 70, which includes PDL generation block 98 and network interface 100, but does not include a RIP, can send PDL instructions through network interface 100 to network bus 66. Printer 76 can receive the PDL instructions through network interface 84, RIP the instructions into a raster image at RIP 86, and print the raster image at print engine 88.

Printer 76 is also coupled to raster network bus 68 via raster network interface 96. Raster connection management 92 maintains unique virtual connections between printer 76 and devices providing raster data, and raster data buffer 90 stores raster data in preparation for printing the raster data at print engine 88. In one embodiment, raster data buffer 90 is large enough to ensure that print engine 88 can print a complete page at its maximum speed, thereby minimizing the banding effect associated with ink from a previous scan drying before the next scan. In another embodiment, raster data buffer 90 is large enough to store at least one complete raster image of a document, thereby allowing multiple copies of the same document to be printed without requiring reRIPing the PDL instructions, and without retransmitting the raster image over the network. In yet another embodiment, raster data buffer 90 is large enough to store two or more raster images, thereby allowing print engine 88 to print one image while raster data buffer 90 receives another. In this embodiment, images may be stored in a FIFO queue and printed on a first-in first-out basis, or prioritized in some other manner. If raster data buffer 90 is sufficiently large, raster images may be permanently stored in buffer 90, and repeatedly printed at the initiation of the user. Because raster data buffer 90 must hold vast amounts of data, in a preferred embodiment of the present invention, buffer 90 comprises at least one hard disc drive.

Printer 76 and 78 are also provided with profile information modules 94 and 108, respectively. Profile information modules 94 and 108 provide media and ink profile information to computer systems that RIP PDL instructions, as will be explained below.

Printer 78 includes print engine 102, raster data buffer 104, raster connection management 106, printer profile information module 108, and raster network interface 110. The elements referenced in printer 78 perform the same functions as the identically named elements in printer 76. However, printer 78 does not include a RIP nor a conventional network interface. Accordingly, printer 78 does not process PDL instructions such as those from computer system 70, but can only process RIP data provided via raster network bus 68.

Printers 76 and 78 are designed to utilize the system of the present invention. However, simpler printers may also be provided with raster data front end 80 to take advantage of the features of the present invention. Raster data front end 80 includes printer profile information module 112, raster network interface 114, raster connection management 116, raster data buffer 118, and printer interface 120. Printer 122 is coupled to raster data front end 80 and includes printer interface 124 and print engine 126. Printer interface 124 of printer 122 and printer interface 120 of raster data front end 80 are connected by line 128 and together may form any common interface as in known in the art, such as a parallel interface, a serial interface, a SCSI interface, etc. With the exception of printer interfaces 120 and 124, the elements referenced in raster data front end 80 and printer 122 perform the same functions as the identically referenced elements of printer 78.

Computer system 72 is comprised of raster network interface 130, raster connection management module 132, media/ink correction module 134, RIP 136, PDL generation module 138, and network interface 140.

Network interface 140 provides access to conventional network 66 for typical network operations, such as file access, E-mail, and the like. PDL generation module 138 represents a device that provides PDL instructions, such as a word processor, a CAD program, or a storage device storing previously generated PDL instructions.

RIP 136 processes the PDL instructions into a raster image. Thereafter, raster connection management module initiates a connection dialogue with printers coupled to raster network bus 68. The connection dialogue results in a virtual connection being opened to a selected printer and will be described in greater detail below.

After a printer is selected, the selected printer provides media and ink information from the printer's printer profile information module (or the printer profile information module of the raster data front end attached to the printer). The information includes the print media presently engaged by the printer, including thickness, transparency and reflectivity characteristics, size, and other factors affecting the print media. The ink information includes the ink lot number, color, and chromatic characteristics of the inks. Media/ink correction module 134 uses the media and ink information of the selected printer to adjust for media and ink differences between printers to produce corrected raster image data. Raster connection management module 132 then transmits the corrected raster image data through raster network interface 130 and raster network bus 68 to the selected printer.

Print server 82 is a device configured to receive PDL instructions from a computing device coupled to network 66, RIP the PDL instructions, and provide the resulting raster data to a printer via raster network bus 68. Print server 82 includes raster network interface 142, raster connection management module 144, media/ink correction module 146, RIP 148, routing 150, and network interface 152. Print server 82 is provided to receive a document represented by a series of PDL instructions from a computer system not coupled to raster network bus 68, such as computer system 70, or simply to off-load RIP processing from another computer system. Routing module 150 is provided to route printing jobs to a selected printer, and provide print job status information back to the computer system that originated the print job. The other referenced elements of print server 82 perform the same functions as the identically referenced elements of computer system 72.

Figure 5:
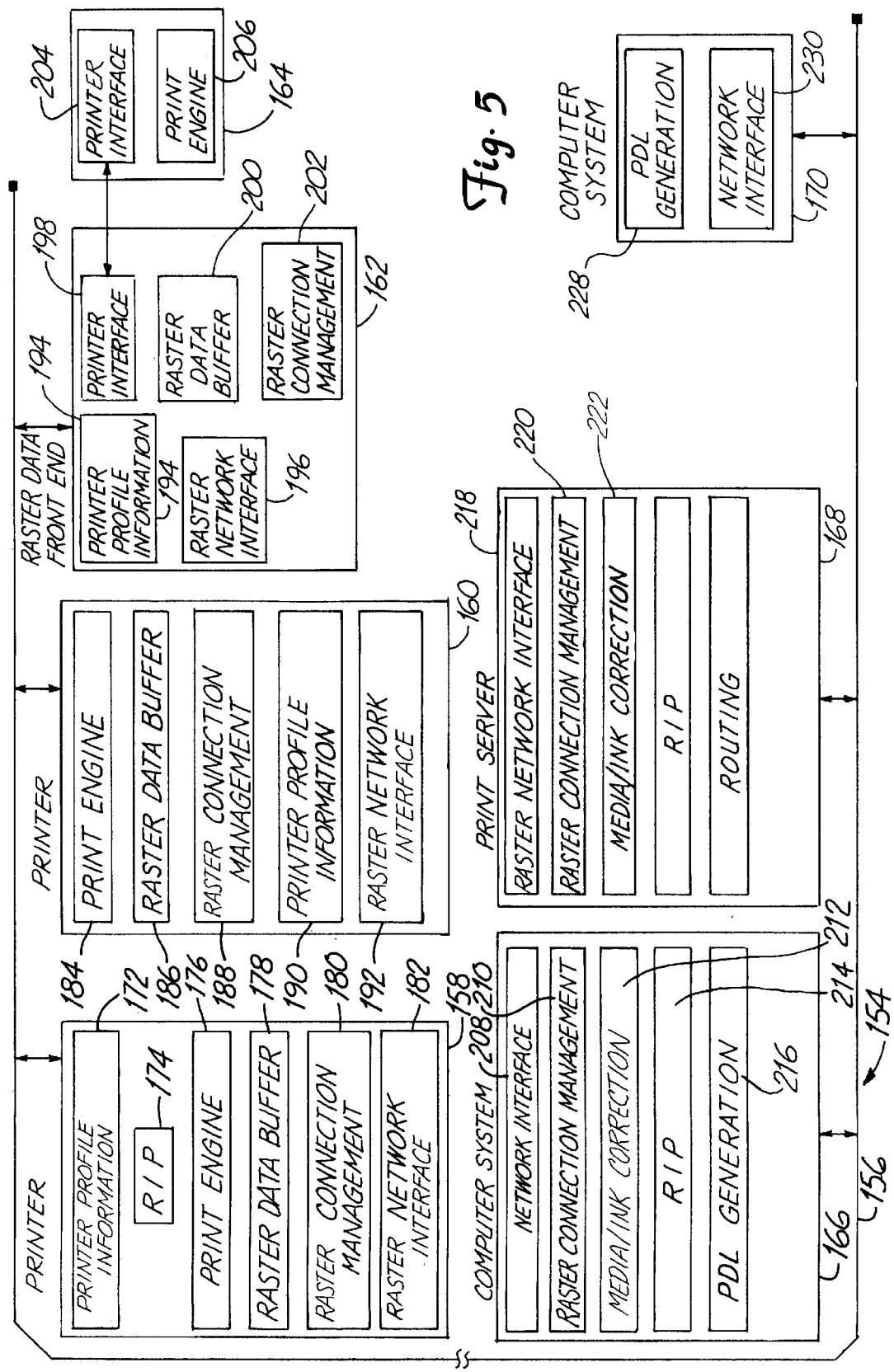
FIG. 5 shows a networked computing system in accordance with at second embodiment of the invention.

FIG. 5 shows a networked computing system 154 in accordance with a second embodiment of the invention. In system 154, the conventional network and the raster network share the same physical network 156. In addition to network 156, system 154 includes printers 158, 160, and 164, raster data front end 162, computer systems 166 and 170, and print server 168.

Printer 158 includes printer profile information module 172, RIP 174, print engine 176, raster data buffer 178, raster connection management module 180, and raster network interface 182. Printer 160 includes print engine 184, raster data buffer 186, raster connection management module 188, printer profile information module 190, and raster network interface 192. Raster data front end 162 includes printer profile information module 194, raster network interface 196, printer interface 198, raster data buffer 200, and raster connection management module 202. Printer 164 includes printer interface 204 and printer engine 206.

Computer system 166 includes raster network interface 208, raster connection management module 210, media/ink correction module 212, RIP 214, and PDL generation 216. Print server 168 includes raster network interface 218, raster connection management 220, media/ink correction module 222, RIP 224, and routing module 226. Finally, computer system 170 includes PDL generation 228 and network interface 230.

Generally, the elements referenced in FIG. 5 perform the same functions as similarly labeled elements in FIG. 4. However, the raster network interfaces of printers 158 and 160, raster data front end 162, computer system 166, and print server 168 communicate via the network using standard ISO-OSI protocols, as well as the unique raster data protocol defined by the present invention.

Figure 6:
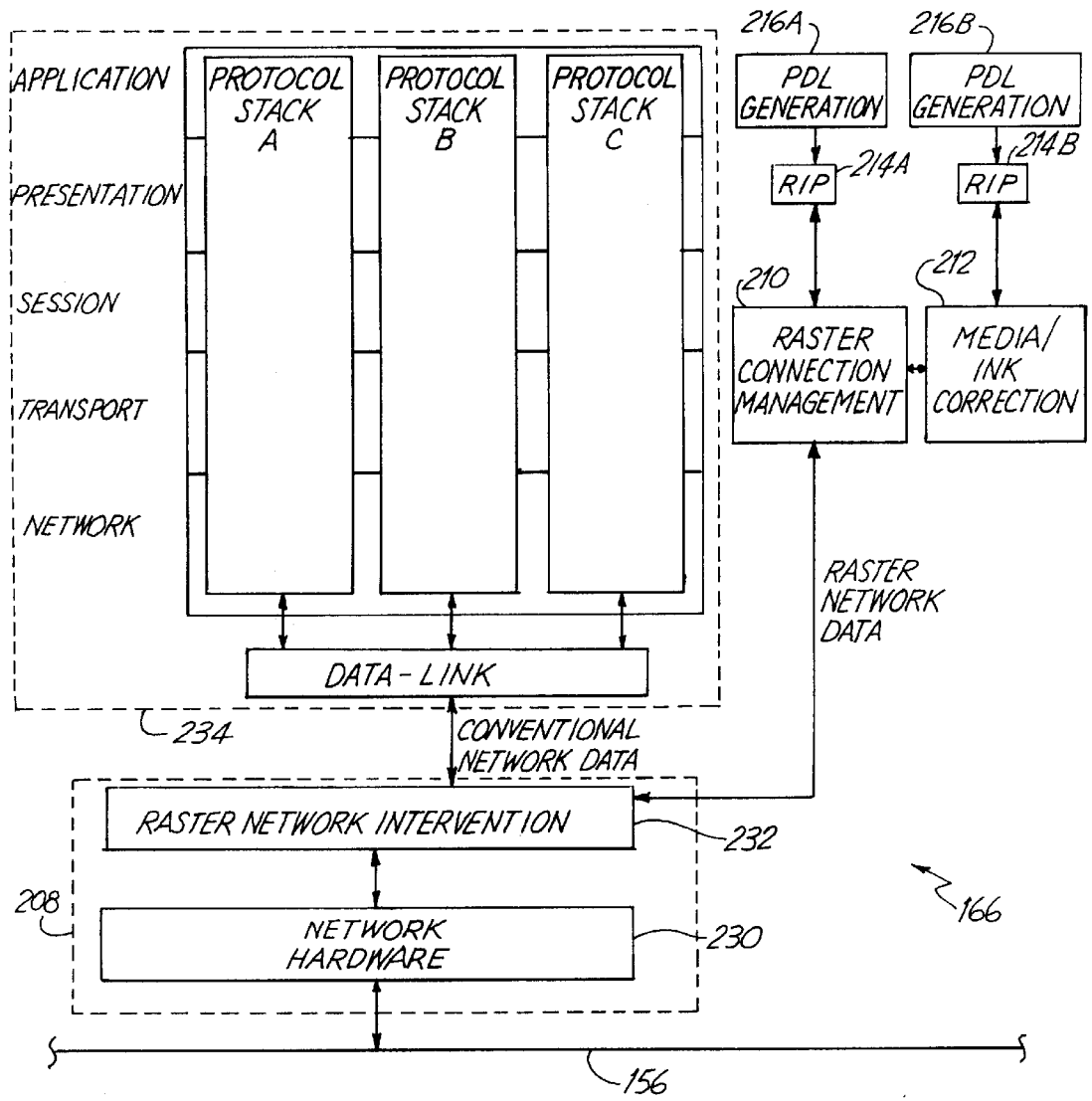
FIG. 6 shows a computer system shown in FIG. 5.

FIG. 6 shows computer system 166 of FIG. 5. In FIG. 6, network hardware 230 of raster network interface 208 is coupled to network 156. Raster network intervention module 232 of interface 208 intervenes between network hardware 230 and raster connection management module 210 and conventional protocol layers 234. FIG. 6 is also representative of print server 168 of FIG. 5. In the embodiment shown in FIG. 4, FIG. 6 is representative of computer system 72 and print server 82, however, conventional protocol layers 234 are not present.

Protocol layers 234 implement the ISO-OSI standard shown in FIG. 2. When a data packet is received by network hardware 230, raster network intervention module 232 examines the packet and determines whether the packet contains raster data. If it does, module 232 sends the relevant portion of the data packet to raster connection management module 210.

In one embodiment of the present invention, module 232 sends any packets that are not raster data packets to conventional protocol layers 234, thereby providing maximum modularity with an existing implementation of conventional protocol layers 234. In another embodiment of the present invention, raster network intervention module 232 is aware of the protocols supported by conventional protocol layers 234, and ignores any packets that are not supported. In this embodiment, the functions of the data link layer and the raster network intervention module may be incorporated into a single module.

Raster connection management module coordinates virtual connections between RIPs and printers. In other embodiments, raster connection management module 210 compresses raster data, decompresses raster data, encrypts raster data, and decrypts raster data as is known in the art. Module 210 also requests printer profile information from a selected printer, and adjusts outgoing raster data at media/ink correction module 212 based on media and ink characteristics of the selected printer.

In FIG. 6, PDL generation modules 216A and 216B provide PDL instructions that are RIPed by RIPs 214A and 214B, respectively. Computer system 166 may have any number of RIPs, which are coordinated by raster connection management module 210. Raster connection module 210 then sends raster data to the selected printer via network bus 156 using the transmission protocol of the present invention, which is described below.

Figure 7:
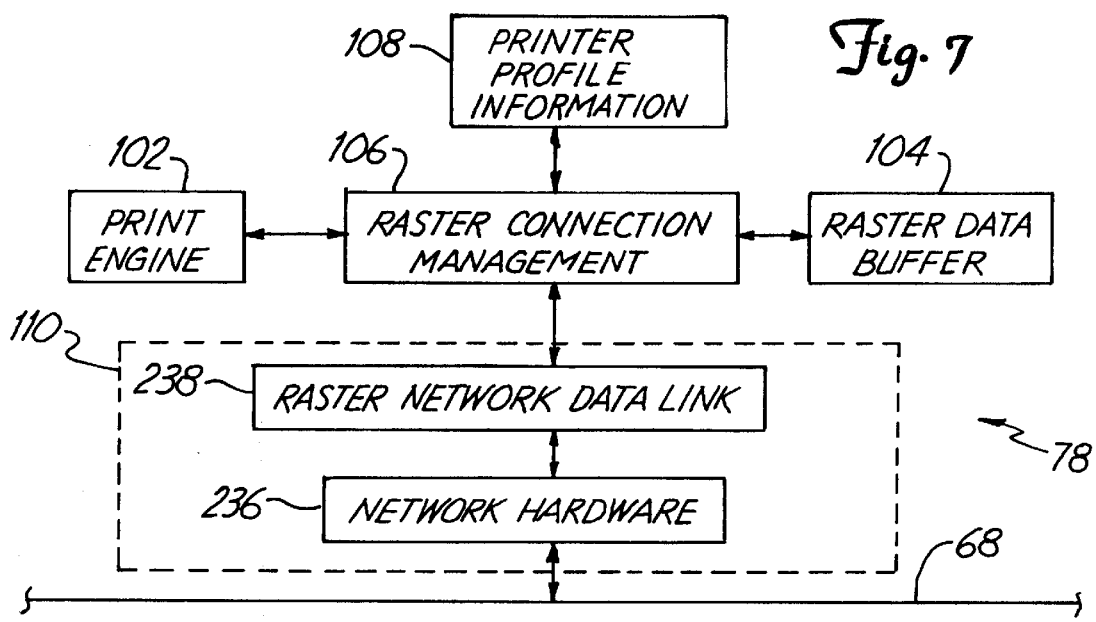
FIG. 7 shows a printer shown in FIG. 4.

FIG. 7 shows printer 78 of FIG. 4. Printer 78 is only coupled to raster data network bus 68 and includes print engine 102, raster data buffer 104, raster connection management 106, and raster network interface module 110. Raster network interface module 110 includes raster network data link module 238 and network hardware 236. If printer 78 were configured to support other protocols, printer 78 would be provided with conventional protocol layers 234 of FIG. 6, and raster network data link module 238 would be replaced with raster network intervention module 232 of FIG. 6.

Figure 8:
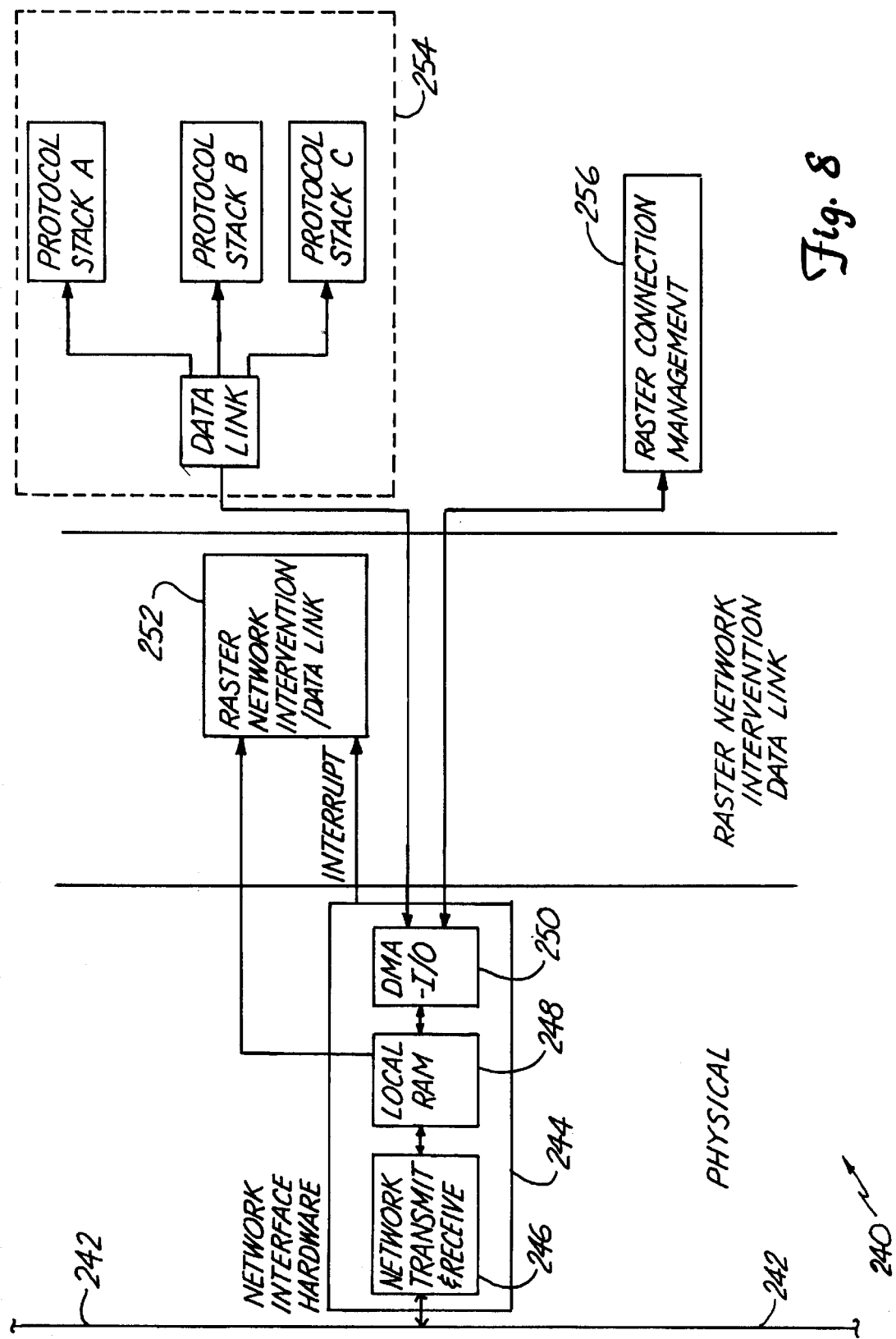
FIG. 8 shows a raster network interface that is generic to a network system wherein the raster data network and the conventional data network share the same physical media such as that shown in FIG. 5, and a network system wherein the raster data network and the conventional data network have separate data networks such as that shown in FIG. 4.

FIG. 8 shows a raster network interface 240 that is generic to a network system wherein the raster data network and the conventional data network share the same physical media such as that shown in FIG. 5, and a network system wherein the raster data network and the conventional data network have separate data networks such as that shown in FIG. 4.

Network interface 240 comprises network hardware 244 and raster network intervention/data link module 252. Also shown in FIG. 8 are network bus 242, raster connection management module 256, and conventional protocol slack 254.

Network hardware 244 includes network transmit and receive module 246, local RAM 248, and DMA-I/O module 250. Network transmit and receive module 246 is coupled to network bus 242 and includes digital-to-analog converters, analog-to-digital converters, modulators, demodulators, and other elements required to transmit and receive data from network bus 242. Local RAM 248 is provided to store data that has just been received from the network or is about to be transmitted to the network. DMA-I/O module 250 is provided to transfer the contents of local RAM 248 to protocol layers 254 or raster connection management module 256, or alternately, to transfer data from layers 254 or module 256 into local RAM 248.

The present invention implements a method of receiving data that greatly reduces overhead processing and data transfer. As discussed above with reference to FIG. 3, in the prior art a received packet is always transferred from local RAM into other RAM that is part of the data link layer.

In contrast, the present invention allows raster network intervention/data link module 252 to examine the contents of local RAM 248. If the contents of RAM 248 are formatted in accordance with a supported protocol, module 252 directs DMA-I/O module 250 to transfer data from local RAM 248 to conventional protocol layers 254 or raster connection management module 256. However, if the contents of RAM 248 do not conform to a supported protocol, the contents are ignored.

In addition, only required data need be transferred from local RAM 248. For example, some commands that are transmitted over a network require only a few bytes to be transferred from local RAM 248, while data packets containing raster data will require over a thousand bytes to be transferred from local RAM. Accordingly, network interface 240 minimizes the amount of data that must be transferred from local RAM 248.

When a computer system or print server system desires to print a document, the system enters into a connection dialogue using the protocol of the present invention. The protocol defines three types of addressing modes and two types of packets. The three addressing modes are directed, broadcast, and multicast. A directed packet is sent to a single device on the network having a unique network address. A broadcast packet is sent to all devices on the network, and a multicast is sent to a subset of devices on a network.

The two types of packets are command packets and data packets. Data packets are used to transfer raster data to printers, and are "connected packets", meaning they are only transmitted in association with a previously established virtual connection. Data packets are directed packets, and are further classified based on the type of raster data they carry. Command packets, on the other hand, may be "connected" or "connectionless packets", and also may be directed, broadcast, or multicast.

When the system desires to print a document, the system first transmits a printer ID request. This printer ID request includes a network address for the system and is contained in a connectionless data packet. The printer ID request may either be broadcast to all network entities, or be multicast only to printers.

All printers capable of handling raster data respond with a printer ID response. The printer ID response is contained in a directed connectionless packet and includes the printer's network address, the printer type, and other information.

The system that issued the printer ID request then issues an open virtual connection request to a printer based on the received printer ID responses. The open virtual connection request is contained in a directed connectionless packet and includes the network address of the system and the maximum number of data packets the system can transmit in a single burst.

The selected printer must respond to the open virtual connection request with an open virtual connection response within a predetermined time limit. The open virtual connection request is contained in a directed connectionless command packet. Receipt of the open virtual connection response by the requesting system establishes the virtual connection. The open connection response includes a connection ID that uniquely establishes the connection in time and the maximum number of data packets that can be received by the printer in a single burst. The maximum number of data packets that the printer can receive in a single burst will be less than or equal to the maximum number of data that the system can transmit in a single burst. This maximum number of data packets will be referred to below as an end sequence number.

Once the virtual connection has been established, the system and the selected printer communicate via the virtual connection using connected command packets and connected data packets. The system sends a job information request command to the printer that includes information about the color streams present in the raster data, the size of the job, and the number of copies to print. The selected printer then issues a job information response command through the virtual connection to the system. The response informs the system whether the printer accepts the information contained in the job information command as valid.

Until this point, the system has initiated the dialogue and the printer has responded. However, at this point the printer becomes the initiator of raster data transfer operations. The printer issues a request/acknowledge command contained in a connected command packet that simultaneously acknowledges data received so far, and requests additional data. The request/acknowledge command includes a data parcel type field that identifies the color stream of the data required by the printer and a current sequence number that acknowledges receipt of all packets comprising a burst up to the current sequence number.

Normally, the system will transmit a complete burst of data packets to the printer without error, in which case the printer responds with a request/acknowledge command having the current sequence number equal to the end sequence number, thereby acknowledging to the system that all the data was received for that partial sequence. However, if a partial or whole burst of data packets is lost or otherwise corrupted, the printer will respond immediately with a request/acknowledge command having the current sequence number, thereby informing the system that a portion of the burst must be retransmitted. In other words, if the printer detects a problem with a burst, the printer requests that the system retransmit the burst, even if the system has not finished transmitting the original burst. By immediately requesting retransmission, the protocol of the present invention recovers from errors faster than prior art techniques.

The system transmits data to the printer using data packets that have a size of approximately one kilobyte in one presently preferred embodiment of the present invention. Accordingly, if the printer and the system negotiated a maximum burst size of 256 kilobytes, a burst would comprise 256 data packets.

In addition to the connected commands described above, there are several other connected commands. A probe command is contained in a directed, connected command packet sent by the system to the printer to inform the printer that the system is still functioning and the virtual connection is still open. In a preferred embodiment, a probe is sent about every 30 seconds. The printer responds to a probe command with a probe response command, which is also contained in a directed, connected command packet. If the printer fails to respond to a probe command with a probe response command within a specified period of time, then the virtual connection is terminated. Finally, a close command is contained in a directed connected packet and terminates the virtual connection. The close command can be initiated by either the system or the printer.

When the transmission of raster data to the printer is complete, either the printer or the system may issue a close connection command, which terminates the virtual connection.

The present invention facilitates printing a document over a network by increasing the speed of raster data transfers over the network. This is achieved by several unique features of the present invention. In one embodiment, a separate network is provided to transmit raster data. By providing a separate network, the total bandwidth of the network is available to transmit raster data.

In addition, the present invention provides a protocol which minimizes protocol overhead within a printer or computer system. A received packet is examined in the local memory of the network hardware, and is ignored if not needed, and only those bytes of the received packet that are required are transferred from local memory. Further, data is transferred directly from the local memory of the network hardware directly to the memory raster connection management module, as opposed to the multiple transfers that occur as data moves up and down a conventional ISO-OSI stack. Finally, the data may be compressed and decompressed to obtain additional network bandwidth. The present invention also defines a unique raster data transmission format that minimizes the handshaking required by prior art transmission protocols.

For any given network, the present invention has the potential to achieve 2–10 times the effective data transfer rate of raster data through the network compared to conventional techniques. Accordingly, the present invention facilitates host based RIPing of documents represented by PDL instructions and anticipates other advances in the art that are dependent on network throughput.

Although the present invention has been described with reference to preferred embodiments, workers skilled in the art will recognize that changes may be made in form and detail without departing from the spirit and scope of the invention.

What is claimed is:

1. A method of printing a document in a computer network system having a raster image processor connected to a printer via both a common network bus and a dedicated raster network bus, the method comprising:

processing at a raster image processor page description language instructions representative of a document to form a raster image representative of the document;

opening a high-speed virtual connection between the raster image processor and a printer on a dedicated raster network bus, the raster image processor also being connected to the printer via a common network bus distinct from the dedicated raster network bus;

transmitting the raster image from the raster image processor to the printer via the high-speed virtual connection on the dedicated raster network bus;

printing the raster image at the printer; closing the high-speed virtual connection on the dedicated rarer network bus;

requesting at least one profile information set, via a raster connection management portion of the computer network system, from a memory, structure electronically coupled to the printer; wherein said one profile information set relates to one or more physical characteristics of a printing media available for printing on the printer as said one or more physical characteristics relates to an ink-based marking material used in said printer;

receiving said at least one profile information set from the printer via the raster connection management portion; and processing the raster image based on the at least one profile information set received from the printer so that a corrected raster image data set is generated for use by the printer, the corrected raster image data set differing due to the at least one profile information set upon which the raster image is based.

2. The method of claim 1 wherein the dedicated raster network includes connections to a plurality of printers and the method further comprises:

broadcasting a network entity ID request to the network on both the common network bus and the dedicated raster network bus;

receiving a printer entity ID response from each printer responding to the network entity ID request; and selecting a printer based on printer entity ID responses.

3. The method of claim 1 wherein the at least one profile information set includes a lot number which indicates a date or manufacture of said ink-based marking materials and at least two chromatic characteristics of said ink-based marking materials used by the printer.

4. The method of claim 1 wherein opening a virtual connection between the raster image processor and the printer comprises:

issuing an open connection request to the printer on the dedicated raster network bus and wherein the open connection request includes a network address of the raster image processor and a maximum data transmit block size representative of a maximum amount of data that can be transmitted by the raster image processor in a single burst over the dedicated raster network bus; and receiving an open connection response on either the common network bus or the dedicated raster network bus indicating that the virtual connection has been established between the raster image processor and the printer on the dedicated raster network bus and wherein the open connection response includes a maximum data receive block size representative of a maximum amount of data that can be received by the printer in a single burst over the dedicated raster network bus.

5. The method of claim 1 wherein the raster image comprises N data blocks, each data block comprises M data packets, and transmitting the raster image from the raster image processor to the printer via the virtual connection comprises:

issuing a job information command to the printer that informs the printer that the raster image comprises N data blocks;

issuing a job information command confirmation to the raster image processor informing the raster image processor that the printer has accepted the job information command;

issuing request/acknowledge commands to the raster image processor unit all N data blocks comprising the raster image have been transmitted to the printer, wherein the request/acknowledge command includes:

a current sequence number representing data packets of a data block currently being transmitted that have been successfully received from the raster image processor and data blocks required by the printer required to complete transmission of the data block currently being transmitted; and an end sequence number representing M for N-1 data blocks, and data packets required to complete transmission of the raster image for a last data block;

transmitting L data packets to the printer over the dedicated raster network bus in a single burst upon receiving a request/acknowledge command, wherein L is equal to a difference of the end sequence number minus the current sequence number of the request acknowledge command.

6. The method of claim 1 and further comprising:

inspecting a first portion of the raster image data and only if said first portion of the raster image data contains specific packet addressing codes for a given printer;

storing the raster image in a memory structure of the given printer;

printing a plurality of copies of the document represented by the raster image stored in the memory structure of the given printer.

7. The method of claim 1, wherein the raster connection management portion comprises a raster connection management module distinct from the raster image processor.

8. A method of printing a document in a computer network system having a raster image processor connected to a printer via both a common network bus and a dedicated raster network bus, the method comprising:

processing at a raster image processor instructions representative of a document to form a first raster image representative of the document;

opening a high-speed virtual connection between the raster image processor and a printer on the dedicated raster network bus, wherein the printer contains circuitry means for receiving a plurality of high-speed raster protocol instructions through the high-speed virtual connection, the raster image processor also being connected to the printer via a common network bus distinct from the dedicated raster network bus;

transmitting the first raster image from the raster image processor to the printer via the high-speed virtual connection on the dedicated raster network bus;

printing the first raster image at the printer;

closing the high-speed virtual connections;

requesting on the dedicated raster network, via a raster connection management portion of the network, at least one profile information set from an electronic memory structure coupled to the printer wherein said at least one profile information set relates to characteristics of a printing ink installed and available for printing on the printer;

receiving said at least one profile information set from the electronic memory structure coupled to the printer via the raster connection management portion; and processing the first raster image based on the at least one profile information set received from the printer so that a second corrected raster image data set is generated by the printer which differs from the first raster image due to he at least one profile information set.

9. The method of claim 8 wherein the computer network includes a plurality of printers each connected to both the common network bus and the dedicated raster network bus, and the method further comprises:

broadcasting a network entity ID request to the network on both the common network bus and the dedicated raster network bus;

receiving a printer entity ID response from each printer responding to the network entity ID request which includes a data string that identifies each printer capable of accepting a plurality of high-speed raster protocol instructions; and selecting a printer based on printer entity ID responses based upon the data string.

10. The method of claim 8 wherein the at least one profile information set includes a chromatic characteristic of the printing ink and a manufacturing characteristic of said printing ink.

11. The method of claim 8, wherein the raster connection management portion comprises a raster connection management module distinct from the raster image processor.

12. A method of printing a document in a computer network system having a raster image processor connected to a printer via both a common network bus and a dedicated raster network bus, the method comprising:

processing at a raster image processor page description language instructions representative of a document to form a raster image representative of the document;

opening a high-speed virtual connection between the raster image processor and a printer on a dedicated raster network bus, the raster image processor also being connected to the printer via a common network bus distinct from the dedicated raster network bus;

transmitting the raster image from the raster image processor to the printer via the high-speed virtual connection on the dedicated raster network bus;

printing the raster image at the printer; and closing the high-speed virtual connection on the dedicated raster network bus;

wherein the computer network system includes connections to a plurality of printers and the method further comprises:

broadcasting a network entity ID request to the network on both the common network bus and the dedicated raster network bus;

receiving a printer entity ID response from each printer responding to the network entity ID request; and selecting a printer based on printer entity ID responses.

13. A method of printing a document in a computer network system having a raster image processor connected to a printer via both a common network bus and a dedicated raster network bus, the method comprising:

processing at a raster image processor page description language instructions representative of a document to form a raster image representative of the document;

opening a high-speed virtual connection between the raster image processor and a printer on a dedicated raster network bus, the raster image processor also being connected to the printer via a common network bus distinct from the dedicated raster network bus;

transmitting the raster image from the raster image processor to the printer via the high-speed virtual connection on the dedicated raster network bus;

printing the raster image at the printer; and closing the high-speed virtual connection on the dedicated raster network bus;

wherein opening a virtual connection between the raster image processor and the printer comprises:

issuing an open connection request to the printer on the dedicated raster network bus and wherein the open connection request includes a network address of the raster image processor and a maximum data transmit block size representative of a maximum amount of data that can be transmitted by the raster image processor in a single burst over the dedicated raster network bus; and receiving an open connection response on either the common network bus or the dedicated raster network bus indicating that the virtual connection has been established between the raster image processor and the printer on the dedicated raster network bus and wherein the open connection response includes a maximum data receive block size representative of a maximum amount of data that can be received by the printer in a single burst over the dedicated raster network bus.

14. A method of printing a document in a computer network system having a raster image processor connected to a printer via both a common network bus and a dedicated raster network bus, the method comprising:

processing at a raster image processor page description language instructions representative of a document to form a raster image representative of the document;

opening; a high-speed virtual connection between the raster image processor and a printer on a dedicated raster network bus, the raster image processor also being connected to the printer via a common network bus distinct from the dedicated raster network bus;

transmitting the raster image from the raster image processor to the printer via the high-speed virtual connection on the dedicated raster network bus;

printing the raster image at the printer; and closing the high-speed virtual connection on the dedicated raster network bus;

wherein the raster image comprises N data blocks, each data block comprises M data packets, and transmitting the raster image from the raster image processor to the printer via the virtual connection comprises:

issuing a job information command to the printer that informs the printer that the raster image comprises N data blocks;

issuing a job information command confirmation to the raster image processor informing the raster image processor that the printer has accepted the job information command;

issuing request/acknowledge commands to the raster image processor until all N data blocks comprising the raster image have been transmitted to the printer, wherein the request/acknowledge command includes:

a current sequence number representing data packets of a data block currently being transmitted that have been successfully received from the raster image processor and data blocks required by the printer required to complete transmission of the data block currently being transmitted; and an end sequence number representing M for N-1 data blocks, and data packets required to complete transmission of the raster image for a last data block; and transmitting L data packets to the printer over the dedicated raster network bus in a single burst upon receiving a request/ acknowledge command, wherein L is equal to a difference of the end sequence number minus the current sequence number of the request acknowledge command.

15. A method of printing a document in a computer network system having a raster image processor connected to a printer via both a common network bus and a dedicated raster network bus, the method comprising:

processing at a raster image processor page description language instructions representative of a document to form a raster image representative of the document;

opening, a high-speed virtual connection between the raster image processor and a printer on a dedicated raster network bus, the raster image processor also being connected to the printer via a common network bus distinct from the dedicated raster network bus;

transmitting the raster image from the raster image processor to the printer via the high-speed virtual connection on the dedicated raster network bus;

printing the raster image at the printer;

closing the high-speed virtual connection on the dedicated raster network bus;

inspecting a first portion of the raster image data and only if said first portion of the raster image data contains specific packet addressing codes for a given printer;

storing the raster image in a memory structure of the given printer; and printing a plurality of copies of the document represented by the raster image stored in the memory structure of the given printer.

16. A method of printing a document in a computer network system having a raster image processor connected to a printer via both a common network bus and a dedicated raster network bus, the method comprising:

processing at a raster image processor instructions representative of a document to form a first raster image representative of the document;

opening a high-speed virtual connection between the raster image processor and a printer on the dedicated raster network bus, wherein the printer contains circuitry means for receiving a plurality of high-speed raster protocol instructions through the high-speed virtual connection, the raster image processor also being connected to the printer via a common network bus distinct from he dedicated raster network bus;

transmitting the first raster image from the raster image processor to the printer via the high-speed virtual connection on the dedicated raster network bus;

printing the first raster image at the printer; and closing the high-speed virtual connection;

wherein the computer network includes a plurality of printers each connected to both the common network bus and the dedicated raster network bus, and the method further comprises:

broadcasting a network entity ID request to the network on both the common network bus and the dedicated raster network bus;

receiving a printer entity ID response from each printer responding to the network entity ID request which includes a data string that identifies each printer capable of accepting a plurality of high-speed raster protocol instructions; and selecting a printer based on printer entity ID responses based upon the data string.

* * * * *

UNITED STATES PATENT AND TRADEMARK OFFICE
CERTIFICATE OF CORRECTION

PATENT NO : 6,091,507
DATED : July 18, 2000
INVENTOR(S) : Vatland et al.

It is certified that error appears in the above-identified patent and that said Letters Patent are hereby corrected as shown below:

In the Abstract, line 2, delete "facilitating" and insert "facilitate".

Column 2, line 42, replace the word "at" with "a".

Column 8, line 57, delete "slack" and replace it with "stack".

Column 11, line 60, after the word "printer", begin a new indentation with the word "closing".

Column 11, line 61, delete the word "rarer" and replace it with "raster".

Column 13, line 60, replace the word "he" with the word "the".

Column 16, line 25, after the words "printer; and", begin a new indentation with the word "printing".

Column 16, line 44, replace the word "he" with the word "the".

Signed and Sealed this

Seventeenth Day of April, 2001

Attest:

NICHOLAS P. GODICI

Attesting Officer

Acting Director of the United States Patent and Trademark Office